United States Patent [19]

Guipaud

[11] 4,066,968
[45] Jan. 3, 1978

[54] METHOD AND APPARATUS FOR PROVIDING A PERIODIC CONTROL SIGNAL, ESPECIALLY FOR CONTROLLING THE IGNITION OF AN INTERNAL COMBUSTION ENGINE

[75] Inventor: Serge Guipaud, Saint Papoul, France

[73] Assignee: Societe Anonyme pour l'Equipment Electrique des Vehicules S.E.V. Marchal, Issy-les-Moulineaux, France

[21] Appl. No.: 562,844

[22] Filed: Mar. 27, 1975

[30] Foreign Application Priority Data

Mar. 28, 1974  France .............................. 74.10861
Mar. 29, 1974  France .............................. 74.11303

[51] Int. Cl.² ........................... F02P 5/08; H03K 5/20
[52] U.S. Cl. ....................................... 328/1; 307/355; 123/148 E; 328/5; 328/127

[58] Field of Search ............... 307/308, 246, 355; 123/148 E; 328/1, 5, 127–128; 324/83 D, 140 D, 176; 310/111; 235/103

[56] References Cited

U.S. PATENT DOCUMENTS 3,852,673  12/1974  Guyot et al. ...................... 328/127

*Primary Examiner*—John Zazworsky
*Attorney, Agent, or Firm*—Brisebois & Kruger

[57] ABSTRACT

A periodic control signal is produced by generating a signal P the duration $q$ of which represents the period of time required for a sector subtending the angle $\phi$ to be driven by a rotating shaft past a fixed point, while the complement of said signal and time period are represented by $\overline{P}$ and $\overline{q}$ respectively. During one of the periods $\overline{q}$ and $q$ a first voltage is generated as a linear function of $q$, and this voltage is stored. A second voltage which is a linear function of time is generated during one of the succeeding periods $q$, and said control signal is generated when the second voltage becomes equal to the first.

4 Claims, 23 Drawing Figures

FIG.12

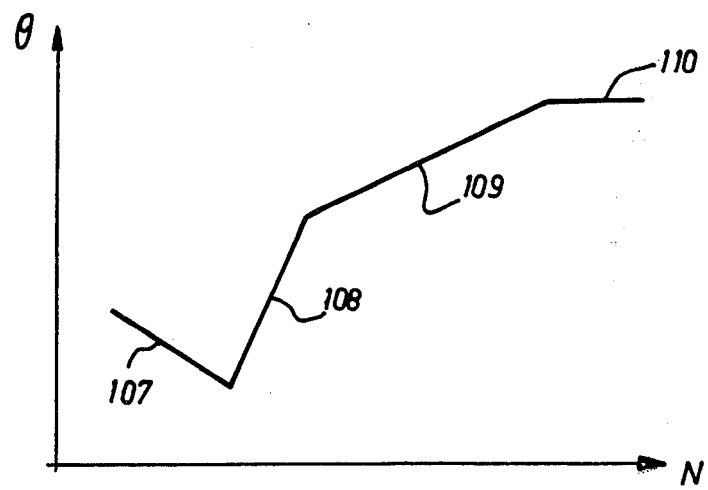
FIG.11
   
FIG.13   FIG.14   FIG.15   FIG.16

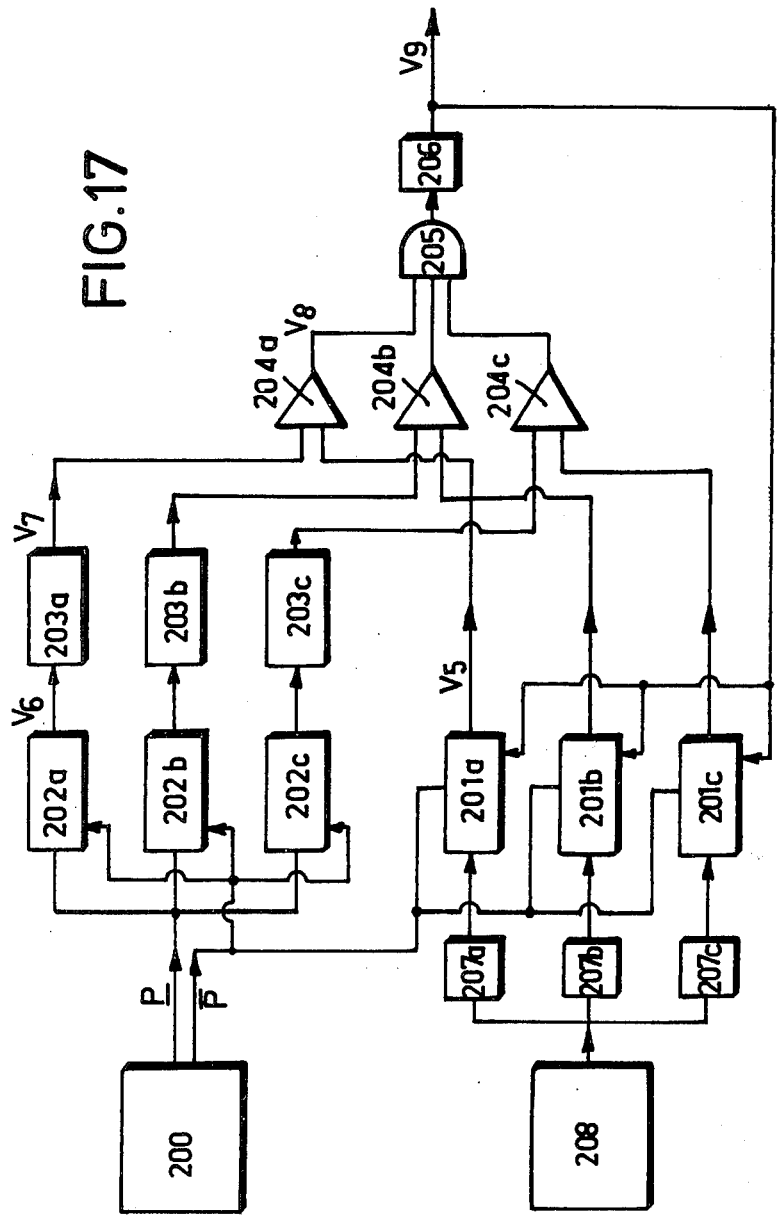

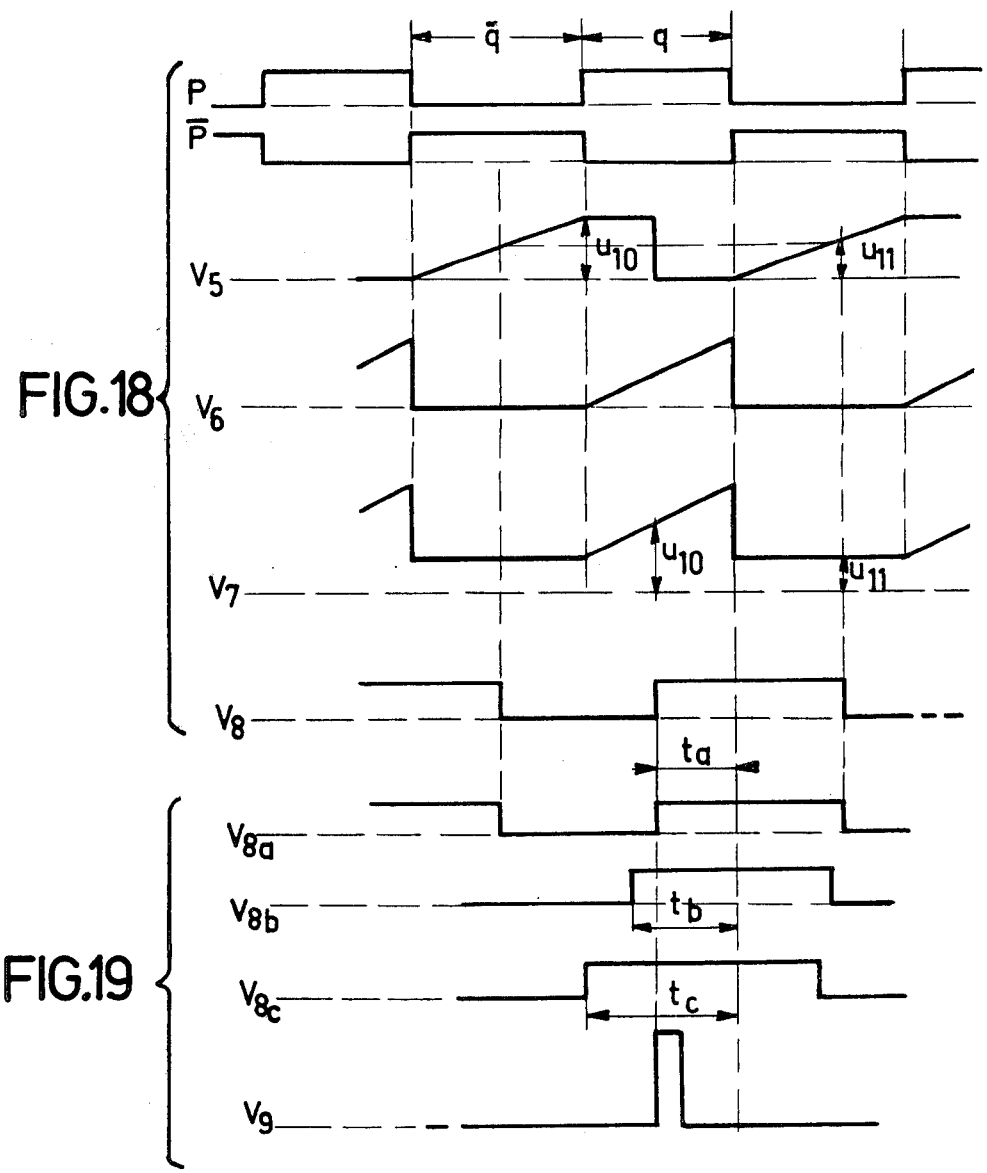
FIG.18
FIG.19
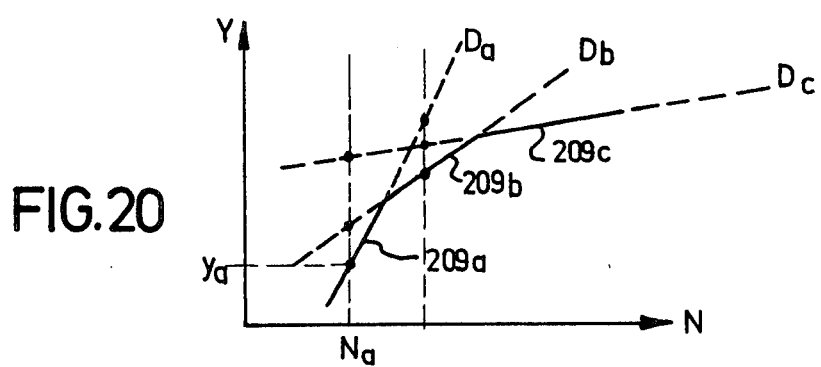
FIG.20

METHOD AND APPARATUS FOR PROVIDING A PERIODIC CONTROL SIGNAL, ESPECIALLY FOR CONTROLLING THE IGNITION OF AN INTERNAL COMBUSTION ENGINE

SUMMARY OF THE INVENTION

In order to insure the satisfactory operation of a reciprocating internal combustion engine such as the motor of an automobile for example, it is necessary to ignite the combustible gas at a predetermined time with respect to the moment at which the piston reaches the top dead center point on the power stroke in the cylinder in question. In devices of a conventional type, the ignition is timed by means of centrifugal advance mechanism and vacuum advance mechanism. These two devices constitute mechanical controls which control the relative positions of a cam and a breaker, the cam being rotated by the motor, and breaker being inserted in the primary circuit of an ignition coil. In such devices the presence of several mechanical parts is a significant cause of engine trouble and the rapid opening and closing of the breaker results in a progressive deterioration of the breaker points so that good operation requires frequent maintenance.

In order to avoid the disadvantages resulting from the use of a breaker, ignition devices have already been proposed which rely on variations in the flux in a magnetic circuit comprising a magnetic pick-up and a cam having projecting bosses which is driven by the motor. This device avoids the regular maintenance of the distributor, since it eliminates the platinized screws which constitute the breaker points, but does not affect the complexity of the centrifugal advance mechanism and the vacuum advance mechanism. It follows that the reliability of the device is not increased.

It is the object of the present invention to describe a device having a very large field of possible application, and in particular making it possible to control the timing of an internal combustion engine by utilizing only electronic components, thus eliminating the mechanical components customarily required. The elimination of the mechanical components is complete insofar as timing adjustments corresponding to the centrifugal advance means are concerned, but for adjustments corresponding to the vacuum advance means it is nevertheless necessary to retain a manometric capsule responsive to the vacuum as a function of which the timing adjustment is controlled. It is also possible, with the device according to the invention, to modify the timing as a function of any mechanical or electrical parameter indicating the load of the motor as a function of the richness of the fuel mixture or the temperature of the exhaust gas or even the average temperature of the motor given by the cooling water or the crankcase oil. The control method and apparatus according to the invention may, however, be applied in fields other than those relating to the control of the ignition timing.

In particular, the invention is adapted to control the duration of the conductivity of the primary circuit of an ignition coil and not merely the opening of the primary circuit, which opening corresponds to the initiation of the ignition. Such an application has already been described for a control device different from the one according to the present invention in Luxembourg application No. 67,322, filed Mar. 28, 1973.

The invention also makes it possible to control auxiliary members associated with a vehicle motor, such for example as a fuel pump, a starter, a fuel injector, a carburetor, an air pump, or an automatic transmission, it being understood that this list of possible applications is given purely by way of example, and other applications may also be envisaged.

The device according to the invention comprises an analog electronic calculator receiving information from a certain number of pick-ups and, in particular, a speed responsive device adapted to measure the speed of rotation of a shaft which, in the case of the control of the ignition of an internal combustion engine, may be a shaft connected to the crankshaft or to the camshaft of the motor. The analog calculator transforms information received into control signals which are transmitted either to the ignition coil or to auxiliary members controlled by the device as hereinbefore indicated. The device according to the invention has the advantage of great simplicity and consequent reduced cost.

It is accordingly an object of the present invention to insure the periodic initiation of at least one operation depending upon one or more parameters and in particular the speed of rotation of a shaft, which operation must be initiated with a phase displacement with respect to the instant at which a mark which turns with the shaft passes a fixed mark. The phase displacement is a function of the speed of rotation of the shaft. The curve representing the angle of phase displacement as a function of speed of rotation is, in a predetermined zone, substantially a straight segment. In this process a signal P is generated (as illustrated in FIG. 3), the length $q$ of which corresponds to the passage of a rotating sector having a constant angle $\phi$ (as best seen in FIG. 1) in front of a fixed mark. The angle $\bar{\phi}$ equal to $(2\pi - \phi)$ corresponds to the absence of this signal for a period of time $\bar{q}$. A signal $\bar{P}$ may be generated throughout the period of time $\bar{q}$. The process is characterized by the fact that, after having generated the signal P, a first voltage is generated for one of the subsequent periods $\bar{q}$ or $q$, which voltage is a linear function of $q$. This first voltage is stored. During one of the subsequent periods $q$ a second voltage is generated which is a linear function of time from the beginning of the period $q$ of the signal P in question. A control signal is generated when the second of the aforesaid voltages becomes equal to the first and this control signal is used to initiate the step in question.

In a preferred embodiment, the first voltage is generated during the period $\bar{q}$ following a period $q$ of the signal P and the second voltage is generated during the next period $q$. The first and second voltages are generated by means of a sawtooth generator comprising an integrator. The first voltage is obtained by means of an integrator receiving the signal $\bar{P}$ and the second voltage is obtained by means of an integrator receiving the signal P. The first voltage is returned to its original level at the moment at which the leading edge of the control signal is produced and that of the second voltage is obtained at the moment at which the leading edge of the signal $\bar{P}$ is produced.

In a first form of this embodiment, the first voltage is a linear function of $q$ and the second voltage is proportional to time. In this case it is also possible to generate the first voltage during a period $q$ of the signal P, to store its final value during the next period $\bar{q}$, and generate the second voltage during the next period $q$. In a second embodiment the first voltage is proportional to the period $\bar{q}$ and the second voltage is a linear function of time.

When the curve of phase displacement as a function of speed of rotation of the shaft consists of a succession of straight lines, a speed discriminator may be provided which receives the signal P or $\overline{P}$ and makes it possible to choose the parameters of the linar function corresponding to the first or the second voltage in dependence on the speed of rotation of the shaft. It is also possible, in aother advantageous embodiment, to generate simultaneously control signals correlated to several segments of the straight lines constituting the curve representing the angle of phase displacement as a function of the speed of rotation, and to select from among these signals the one which corresponds to the smallest and the largest phase displacement in dependence on which curve of phase displacement has its concavity downward or upward; to choose a control signal among all the control signals obtained simultaneously, in this case the signals are transmitted to the input of an AND gate. Each of the control signals is produced simultaneously by distinct circuits having the same construction.

It is a further object of the present invention to provide a first device adapted to carry out the process hereinbefore defined and adapted in particular to assure the proper timing of the ignition of a reciprocating internal combustion engine with respect to the high dead point of the stroke of each piston, in which the curve representing the angular phase displacement as a function of the speed of rotation consists of a group of $n$ straight segments, said device comprising a stationary pick-up which cooperates with a sector having an angle $\phi$ associated with a shaft, the speed of rotation of which controls the initiation of each operation. This pick-up supplies during passage of the sector having the angle $\phi$, a signal P having the period $q$. This device is characterized by the fact that it comprises in the first place, a discriminator between speed zones making it possible to select, as a function of the speed of rotation, a calculating circuit to generate, on the one hand, a first voltage which is a linear function of the period $q$ and, on the other hand, a second voltage proportional to time and, in the second place, $n$ calculating circuits each comprising, on the one hand, a generator for the said first voltage and a generator for the said second voltage and, on the other hand, a device for comparing the two voltages and generating a control signal from the moment at which it is established that these two first and second voltages are equal, and preferably, up to the end of the period $q$ in question, together with a circuit for returning to its initial value the first and second voltages which operates between the moment at which the control signal is produced and the end of the period $q$ in question.

In a preferred embodiment of the invention, the device for discriminating between speed zones consists of an integrator supplied by the signal P, the output of which is proportional to the period $q$ of the signal P and is delivered to $(n - 1)$ comparators, each having another input biassed by a fixed predetermined voltage, the outputs of said comparators supplying a continuous signal from the time that equality between the two inputs is attained and each being connected to one of the inputs of a gate forming part of an assembly of $n$ AND gates, all the gates of the assembly having a different number of inputs equipped with inverters, the outpus of the AND gates each controlling a switch which supplies one of the calculating circuits. When it is desired to add to the phase displacement obtained by the device according to the invention, a phase displacement independent of the speed of rotation of the shaft, as a function for example of at least one other phenomenon such as the vacuum in the intake, in the case of a control for the ignition of a reciprocating internal combustion engine, the supply to said switches is supplied with a voltage which is a function of these phenomena. When the phenomenon to be utilized is the vacuum in the intake, the voltage supplying the switches is a decreasing function of the vacuum. Each calculating circuit corresponds to a step in the curve representing the phase displacement as a function of the speed of rotation of the shaft, and the outputs of two integrators constituting the voltage generators are directly connected to the comparator. When the calculating circuit corresponds, on the curve of phase displacement as a function of speed of rotation of the shaft, to a straight segment having a positive slope, the generator of the first voltage consists of an integrator, the output voltage of which is added by means of an adder to a fixed positive potential, and the generator of the second voltage consists of an integrator followed by an inverter. When the calculating circuit corresponds on the curve of phase displacement as a function of the speed of rotation of the shaft to a straight segment of negative slope, the generator of the first voltage consists of an integrator, the output of which is connected to a subtractor making it possible to subtract therefrom a fixed voltage. This subtractor is preferably an adder, the negative terminal of which is supplied by the output of the integrator and the positive terminal of which is supplied with the voltage to be subtracted, and the generator of the second voltage consists of an integrator followed by an inverter.

It is a further object of the present invention to provide a second device adapted to carry out the above described process and adapted in particular to handle the timing of the ignition of a reciprocating internal combustion engine with respect to the high dead point in the stroke of each piston when the curve showing the angular phase displacement as a function of the speed of rotation comprises as assembly of $n$ straight segments. This device comprises a stationary pick-up which cooperates with a sector having the angle $\phi$ associated with the shaft, the speed of rotation of which determines when the operation is to start, said pick-up furnishing during the passage of the sector having the said angle $\phi$ a signal P of duration $q$ which corresponds to a complementary signal $\overline{P}$ having a period $\overline{q}$, and characterized by the fact that it comprises in the first place $n$ identical circuits, each comprising, on the one hand, a generator of a first voltage proportional to the period $\overline{q}$ and, on the other hand, a generator of a second voltage which is a linear function of time, and finally a comparator of the first and second voltages and, in the second place, an AND gate, the inputs of which are supplied by the $n$ outputs of the $n$ above mentioned comparators, the output signal of the AND gate being used to initiate the ignition signal.

In a preferred embodiment of the invention, the generator of the first voltage consists of an integrator receiving the signal $\overline{P}$; the generator of the second voltage consists of an integrator receiving the signal P which may be associated with a device permitting the addition of a constant voltage; the generator of the first voltage is returned to its initial state by the leading edge of the control signal; and the generator of the second voltage is returned to its initial state by the leading edge of the signal $\overline{P}$. In the case of an ignition for a vehicle, the AND gate controls a monostable which itself controls a power amplifier positioned in the supply circuit of an ignition coil for the motor of the vehicle and consisting for example of a transistor. When it is desired to add to the phase displacement obtained by the device according to the invention, a phase displacement independent of the speed of rotation of the shaft, as a function for example of at least one other phenomenon such as the vacuum in the intake, in the case of an ignition system for a reciprocating internal combustion engine, a voltage which is a function of the phenomenon to be relied on is supplied to each of the generators of the first voltage to modify the slope of the sawteeth obtained by these generators.

In the remainder of this application the symbols shown on FIGS. 13, 14 and 15 will be used to represent the electronic logic components, the AND gates, the inverters, and the OR gates. A schematic representation of the operational amplifiers is given on FIG. 16, it being understood that the components utilized may be amplifiers or adders or subtractors, inverters or comparators.

In order that the object of the invention may be better understood, two embodiments thereof will now be described purely by way of illustration and example with reference to the accompanying drawings on which:

FIG. 1 schematically represents a measuring device comprising a sector having the angle $\phi$ and a fixed pick-up;

FIG. 5 shows the signals at different points on the circuit of FIG. 4;

FIG. 11 shows the typical curve of the ignition timing which it is desired to obtain in the first embodiment according to the invention;

FIGS. 13 to 16 show respectively the symbols used for the AND gates, the inverters, the OR gates, and the operational amplifiers;

FIG. 17 shows the circuit diagram of a second embodiment of the electronic device according to the invention, which device comprises three identical circuits corresponding to three different straight segments of the ignition timing curve which the device is designed to produce;

FIG. 18 represents the signals at different points of one of the three identical circuits which the device of FIG. 17 comprises;

FIG. 19 represents the output signals of the three comparators of the three circuits of the device of FIG. 17 and the control signal obtained at the output of the device of FIG. 17;

FIG. 20 represents the timing curve which is obtained from the device of FIG. 17.

Figure 1:
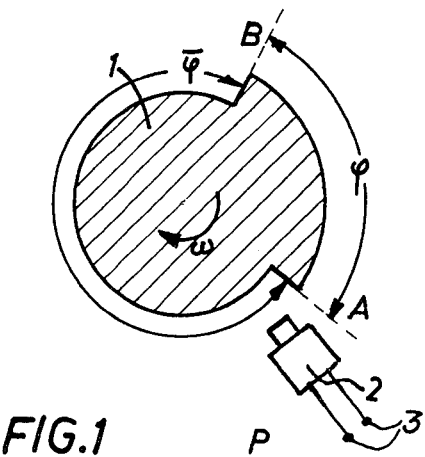

Referring now to the drawing, it will be seen that, on FIG. 1, there is shown schematically in section, as seen from the bottom, a disc 1 connected to a crankshaft which rotates opposite a stationary proximity pick-up 2. On a sector AB having the angle $\phi$, the disc 1 carries a protuberance such that the sector AB, when passing the pick-up 2, produces at the output terminals 3 of the pick-up 2 a signal P of duration $q$, the period of the signal being inversely proportional to the speed of rotation $\omega$ of the disc 1. The pick-up 2 is so positioned that the passage of the end B of the protuberance by the pick-up 2 corresponds to the arrival of the piston of a reciprocating internal combustion engine driving the disc 1 at the high dead point of its stroke, the direction of rotation of the disc 1 being indicated on the figure by the arrow. The angle $(2\pi - \phi)$ will hereinafter be designated by $\bar{\phi}$. The time required for the passage of the sector of angle $\bar{\phi}$ by the pick-up 2 will be indicated by $\bar{q}$. The signal P is at the level 1 during the passage of the sector having an angle $\phi$ by the pick-up 2 and at the level zero thereafter for a time period $\bar{q}$. From this signal, by means of an inverter, may be obtained the signal $\bar{P}$ which is at the level zero when the signal P is at the level 1 and at the level 1 when the signal P is at the level zero. The trailing edge of the signal P or the leading edge of the signal $\bar{P}$ corresponds to the high dead point, that is to say, an ignition phase displacement of zero.

The first embodiment of the invention, which corresponds to FIGS. 2–12, will now be described in detail.

If it is desired to advance the ignition by a constant angle $\delta$, the moment at which the ignition must be initiated is spaced from the leading edge $F_A$ of the pulse by a time $$t = (\frac{\phi - \delta}{\phi} \bar{q}) = \alpha \bar{q}.$$

The time $t$ counted from the leading edge $F_A$ is thus proportional to the time $\bar{q}$ and, if it be supposed that the variation in the speed of rotation of the disc 1 is slow enough that the difference between two successive values of $\bar{q}$ leads to a negligible error, it will be seen that an integrator operating during the time $\bar{q}$ can be used to establish a voltage proportional to $t$. This voltage is stored for the length of the next period $q$ counting from the leading edge $F_A$, which terminates the period $\bar{q}$ during which the voltage $V_1 = \gamma \alpha \bar{q}$ is generated. A second voltage proportional to time may then be generated, beginning at $F_A$, the coefficient of proportionality being equal to $\gamma$, and at the moment at which the first and second voltage are equal the time, counting from the leading edge $F_A$, will be equal to $a\bar{q}$.

Figure 2:
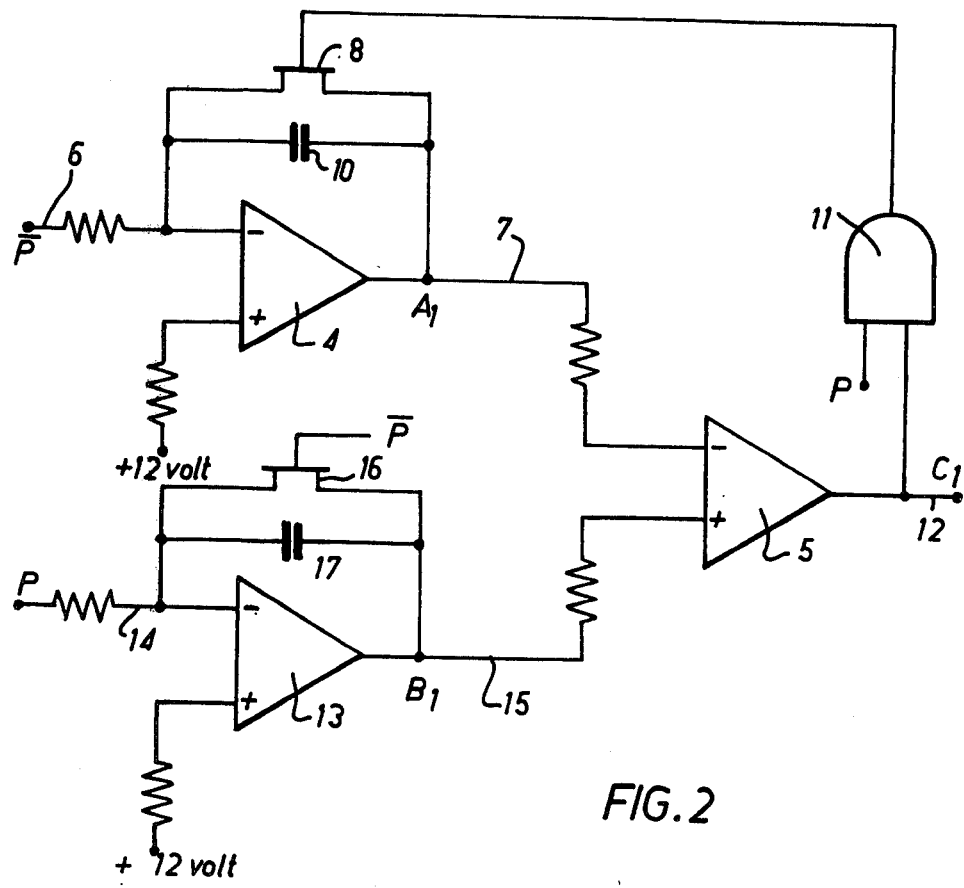
FIG. 2 shows a calculating circuit making it possible to obtain a stepped curve for the phase displacement in a first embodiment according to the invention from the signals emitted by the pick-up.

The calculating circuit for carrying out the various steps in the above described process is represented on FIG. 2. On this figure it will be seen that in order to provide the first voltage equal to $\gamma a\bar{q}$, an operational amplifier 4 is used, the positive input of which is supplied with a 12 volt current by the battery of the vehicle and the negative input of which is connected to a device generating the signal $\overline{P}$. The output of the amplifier 4 is connected to the negative input of a comparator 5 through a suitable resistance. The amplifier 4 is reset to zero through its connection to the input 6 over which the signal $\overline{P}$ arrives, and the output 7 of the component 4 of a field effect transistor 8 between the source and the drain of which is connected a condenser 10. The grid of the transistor 8 is connected to the output of an AND gate 11, on of the inputs of which receives a signal P and the other input of which is connected to the input 12 of the comparator 5. The operational amplifier 4 functions as an integrator and makes it possible to obtain at the output 7 a voltage $(12 - \gamma a\bar{q})$, which is stored by the condenser 10 until it renders the transistor 8 conductive, that is to say until the base of this transistor is brought to 12 volts. The second voltage proportional to time and equal to $(12 - \gamma t)$ is generated by means of an operational amplifier 13 identical to amplifier 4 to the extent that its negative input 14 receives the signal P. Between the input 14 and the output 15 of the amplifier 13 are connected in parallel, on the one hand, a field effect transistor 16, identical to the transistor 8, and, on the other hand, a condenser 17. The connection of the components 16 and 17 is identical to the connection of the components 8 and 10. The base of the transistor 16 receives the signal $\overline{P}$. The output 15 of the component 13 is connected to the positive input of the comparator 5.

Figure 3:
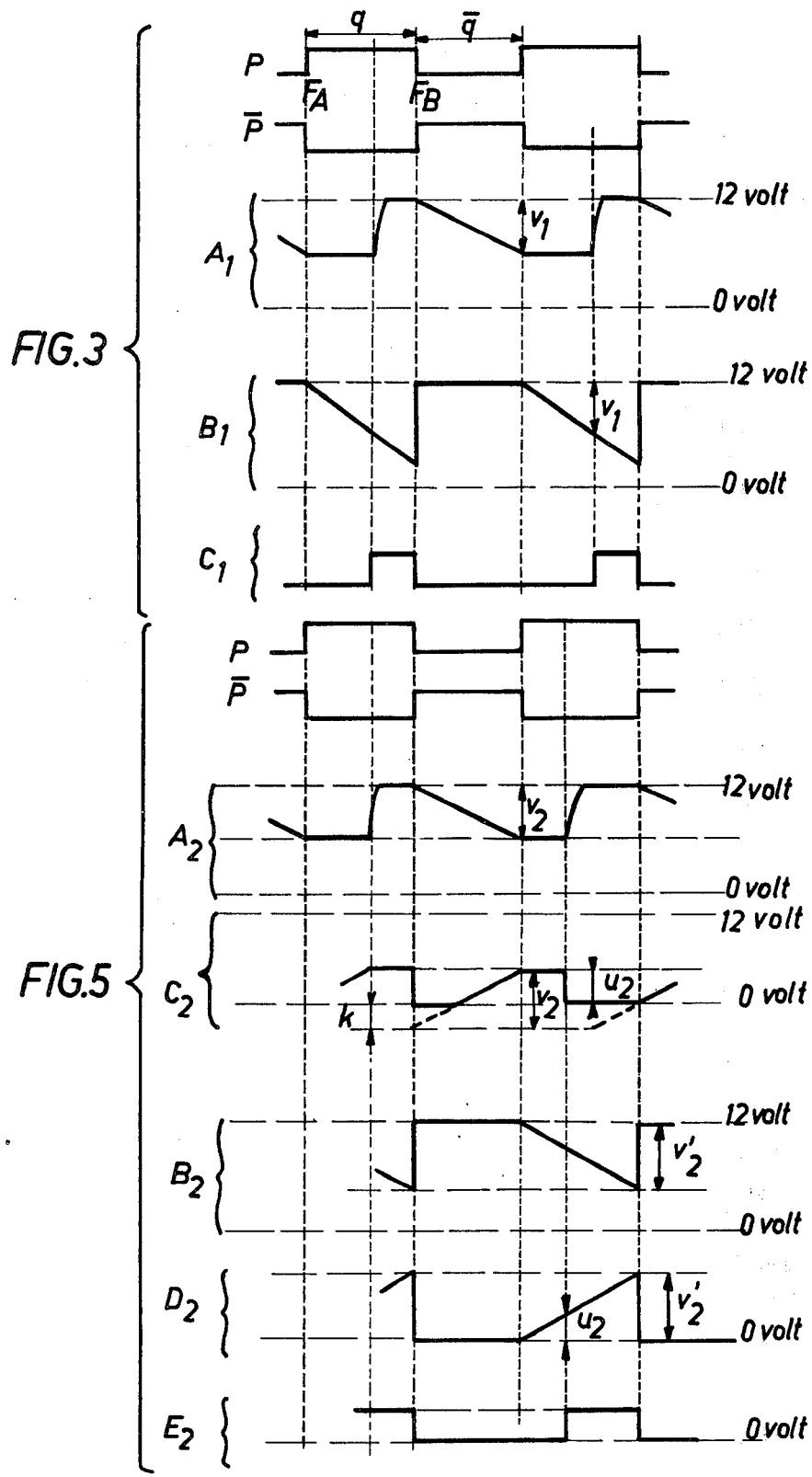
FIG. 3 shows the signals at different points on FIG. 2.

On FIG. 3, the third line shows the voltage at the point A1 of the circuit of FIG. 2. The value of the voltage at the end of the signal $\overline{P}$ is equal to $(12 - \gamma a\bar{q})$ expressed in volts. This voltage, stored in condenser 10 is maintained on the negative terminal of the comparator 5. During the following signal P, the voltage at the point $B_1$ of the diagram of FIG. 2 varies as indicated at the fourth line of FIG. 3. This voltage is returned to its initial value, that is to say to 12 volts, by the leading edge of the signal $\overline{P}$. When the two voltages at $A_1$ and $B_1$ are equal, the comparator 5 emits at its output 12 a signal $C_1$ the shape of which is represented on the fifth line of FIG. 3. Since the AND gate 11 has an input supplied by the signal P and its other input connected to the input 12, the presence of a signal at the output 12 during the period of the signal P supplies the grid of the transistor 8 and causes the return of the voltage at the output 7 of the component 4 to its initial value, this voltage being maintained at 12 volts until the leading edge of a new signal $\overline{P}$ arrives. The return of the output 15 to its initial value due to the arrival of the leading edge of $\overline{P}$ terminates the signal generated by the comparator 5 at the output 12. The leading edge of the signal at the output 12 is produced at the time at which it is desired to initiate the ignition, allowing for the value $\delta$ of the angle of advance of the desired ignition.

When it is desired to obtain a curve of advance of the ignition as a function of the speed of rotation of the disc 1 in the form of a straight segment having a positive slope, the angle of advance of the ignition which is desired responds to the expression $(K\omega + \delta)$, $\delta$ and $K$ being positive constants and $\omega$ being the angular speed of rotation of the disc 1. Under these conditions it may be easily calculated that the time $t$, at which the ignition is to be initiated by the leading edge of the signal P is equal to $$[-K + (\frac{\phi - \delta}{\phi})\bar{q}].$$

If it be supposed that in the case of the step previously described the variation in the value $\bar{q}$ for two successive rotations of the disc 1 results in a negligible error with respect to the value of time $t$ corresponding to a signal P, it will be seen that under these conditions the value of the time $t$ relative to the leading edge of a signal P may be expressed as a function of the preceding period $q$ by the formula $t = -K + \alpha \bar{q}$. One may thus generate during the duration of a signal $\overline{P}$ a first voltage $V_2 = \gamma(-K + \alpha \bar{q})$, store this voltage after the end of the signal $\overline{P}$ from which it has been derived, and then derive during the next time $q$ a second voltage proportional to time, the coefficient of proportionality being $\gamma$, and when the two voltages are equal one has reached the time $t$ at which the ignition signal should be initiated.

Figure 4:
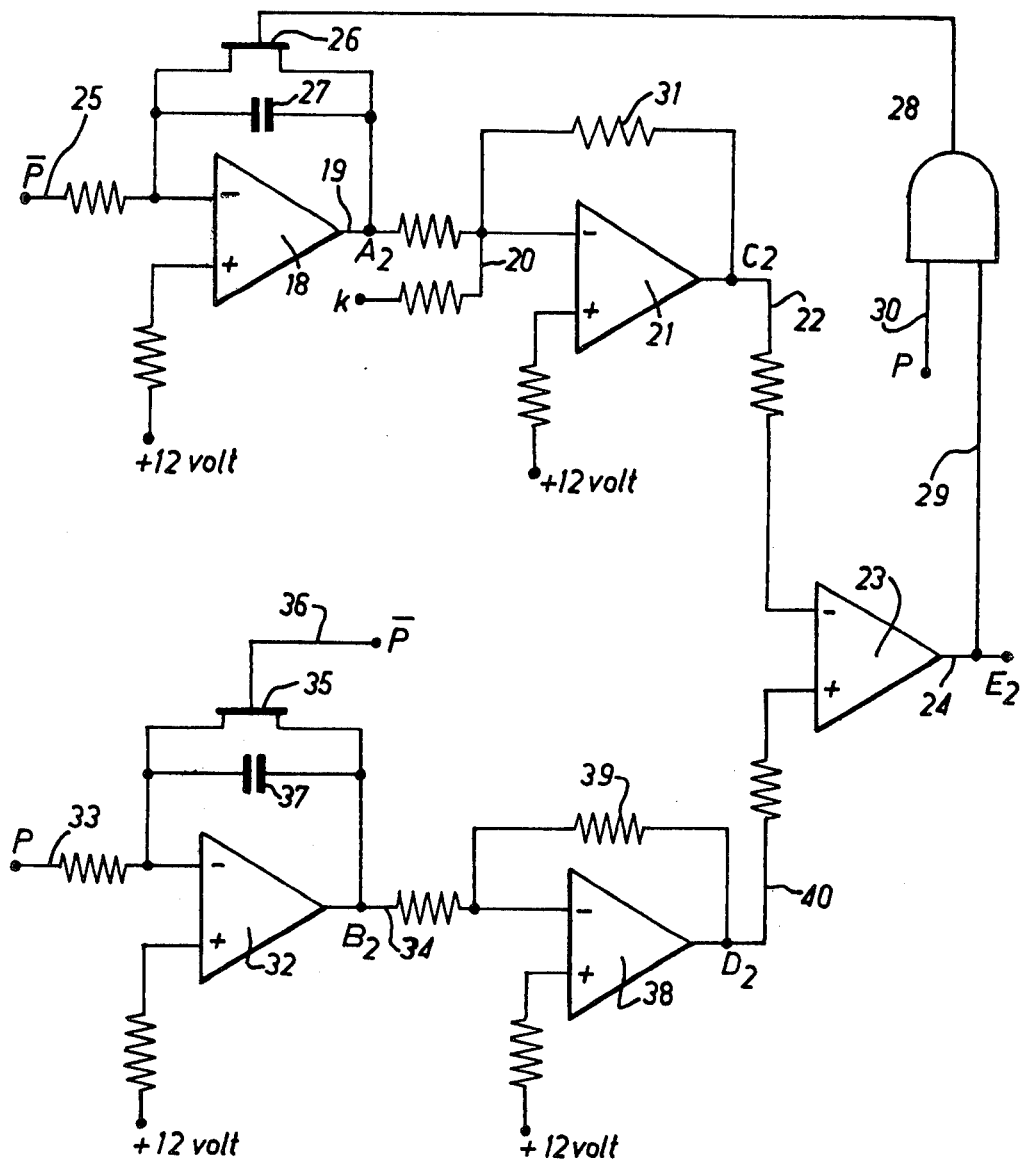
FIG. 4 shows the circuit diagram of a calculator making it possible to obtain in the first embodiment of the invention a phase displacement curve consisting of straight segments having a positive slope.

FIG. 4 shows a calculating circuit making it possible to generate these voltages and to obtain a signal, the leading edge of which is produced at the time at which it is desired to intitiate the ignition. From FIG. 4 it will be seen that the first voltage is obtained by means of an operational amplifier 18, the negative input of which receives the signal P and the positive input of which is connected to a source of +12 volt current. The output 19 of the operational amplifier 18 is connected to a positive voltage having a value $k = \gamma K$ provided over the conductor 20, the assembly being connected to the negative input of an adder 21 consisting of an operational amplifier analogous to the component 18. The output 22 of the component 21 is connected to the negative input of a comparator 23, the output of which is indicated by reference numeral 24. Between the input 25 of the amplifier 18 which is supplied by the signal $\overline{P}$ and its output 19, there is connected in parallel a field effect transistor 26 across the terminals of which is connected a condenser 27, the circuit 18-26-27 being analogous to the circuit 4-8-10 previously described. The grid of the transistor 26 is connected to the output of the AND gate 28, one of the inputs 29 of which is connected to the output 24 of the comparator 23 and the other input 30 of which receives the signal P. A resistance 31 is positioned between the negative input of the adder 21 and the output 22 of the adder. The positive input of the adder 21 is connected to the 12 volt supply voltage. During the period $\bar{q}$ the operational amplifier 18 functions as an integrator, so that at the end of the period $\bar{q}$ of a signal $\overline{P}$ the voltage of the output 19 stored by the condenser 27 is equal to $(12 - \gamma \alpha \bar{q})$. At the end of the signal $\overline{P}$ the voltage of the output 22 of the adder 21 is $U_2 = 12 - [12 - \gamma a\bar{q} + \gamma K] = \gamma(-K + a\bar{q})$.

The second voltage generated during the signal P is obtained by means of an operational amplifier 32, the negative input 33 of which is supplied by the signal P and the positive input of which is connected to the +12 volt supply voltage. The operational amplifier 32 comprises between its output 34 and its input 33 a by-pass connected across a field effect transistor 35, the base of which receives through the conductor 36 the signal $\overline{P}$. Across the terminals of the transistor 35 is connected a condenser 37. The output 34 of the component 32 is connected to the negative input of the converter 38, consisting of an operational amplifier component, the positive input terminal of which is connected to the +12 volt supply. A resistance 39 is connected between the negative input of the component 38 and its output 40, said output being connected to the positive input terminal of the comparator 23. During the duration of the signal P, the component 32 functions as an integrator so that the voltage obtained at the output 34 is equal to $(12 - \gamma\tau)$, $\tau$ being the elapsed time counted from the leading edge of the signal P, and $\gamma$ being a coefficient of proprotionality. It follows that the voltage at the output 40 of the inverter 38 is equal to $\gamma\tau$, the maximum of this voltage being $V'_2 = \gamma\,q$ at the end of the signal P. As has already been seen, the voltage at the input 22 of the comparator 23 reaches, at the end of the preceding signal $\overline{P}$, the value U2, and when the voltage at the input 40 is equal to U2, the comparator 23 delivers at its output 24 a signal which may be utilized to initiate ignition, since this signal is produced at the time $t$ counted from the leading edge of the signal P in question. When this signal is produced at the output 24, the AND gate 28 permits the base of the transistor 26 to be supplied so that this transistor becomes conductive. This returns to its initial value, that is to say, +12 volts, the voltage of the output 19 of the component 18. It should be noted that the voltage at the end of the signal $\overline{P}$ at the output 19 of the component 18 is equal to $(12 - V_2)$ with $V_2 = \gamma\,\alpha\,\overline{q}$, and that the voltage at this moment at the output 22 of the adder 21 is equal to $U2 = V2 - \gamma K$. However, the voltage at this output 22 is never negative as shown by the fourth line on FIG. 5. On this FIG. 5 the second to sixth lines show the waveform of the voltages respectively at the points A2, C2, B2, D2, E2 of the diagram of FIG. 4. The volage at the output 34 of the component 32 is returned to its initial value by the leading edge of the signal $\overline{P}$, which renders the transistor 35 conductive. This returns to zero the voltage at the output 40 of the inverter 38 and at the output 24 of the comparator 23.

When it is desired to provide a curve representing the advance of the ignition as a function of the speed of rotation of the disc 1 having the form of a straight segment with a negative slope, the advance of the ignition may be expressed in the form of $(-K\omega + \delta)$, $K$ and $\delta$ being positive constants and $\omega$ being the angular speed of rotation of the disc 1. Under these conditions the time $t$, counted from the leading edge of the signal P, at which it is desires to initiate the ignition may be expressed in the form $$t = [K + (\frac{\phi - \delta}{\phi})\overline{q}],$$

that is to say, in the form $K + \alpha\overline{q}$. If it be supposed that, as in the case of the embodiment using a line segment having a positive slope, one may use with a negligible error, the previously value of $\overline{q}$, it is then possible to generate a first voltage having a value $\gamma(K + \alpha\overline{q})$ during a signal $\overline{P}$, $\gamma$ being a coefficient of proportionality, and one may generate during the next signal P a second voltage $\gamma\tau$, $\tau$ being the time counted from the leading edge of the signal P, so that, when the stored first voltage and the second voltage are equal, the time $t$ at which the ignition signal should be initiated will have been reached.

Figure 6:
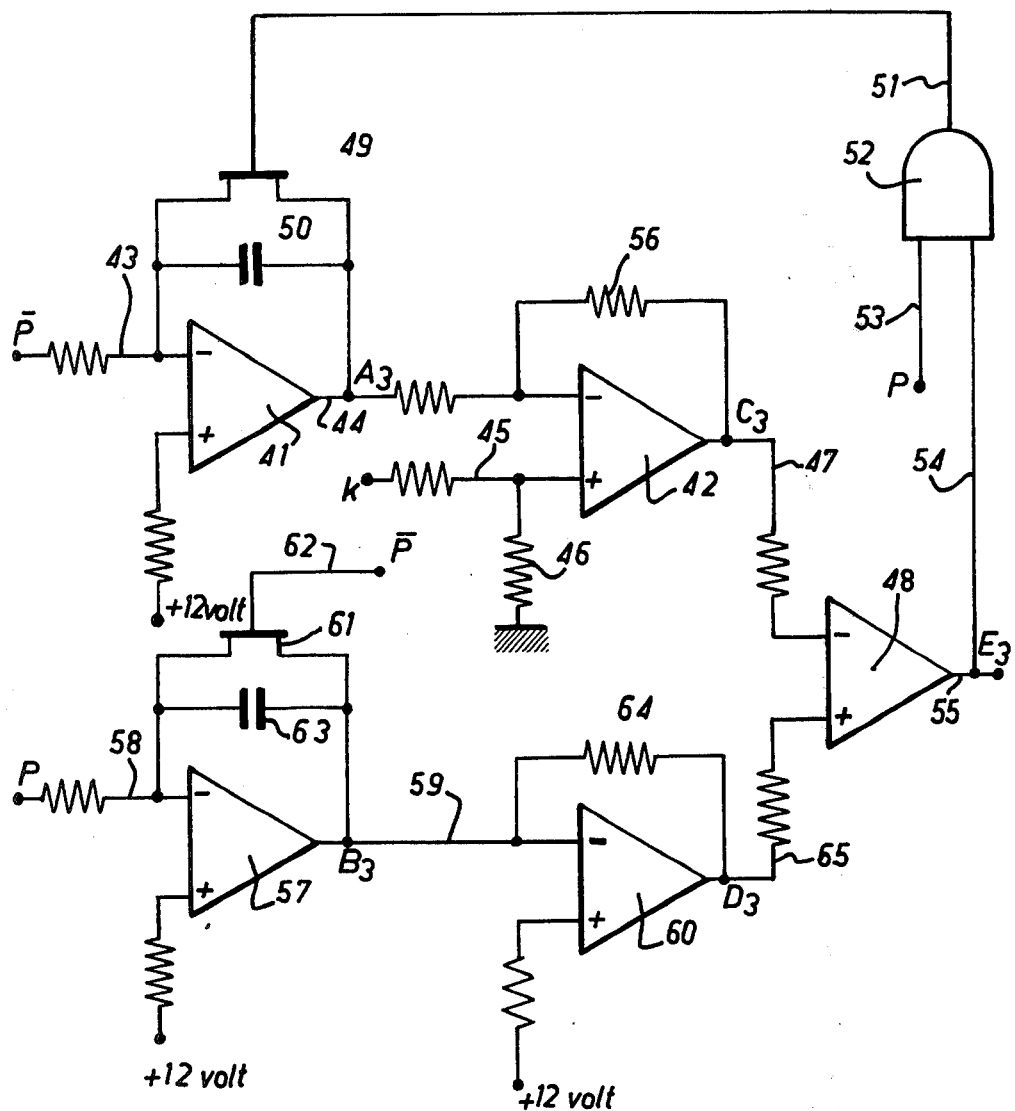
FIG. 6 shows the diagram of a calculating circuit making it possible to obtain in the first device according to the invention a curve of phase displacement having straight line segments having a negative slope.
Figure 7:
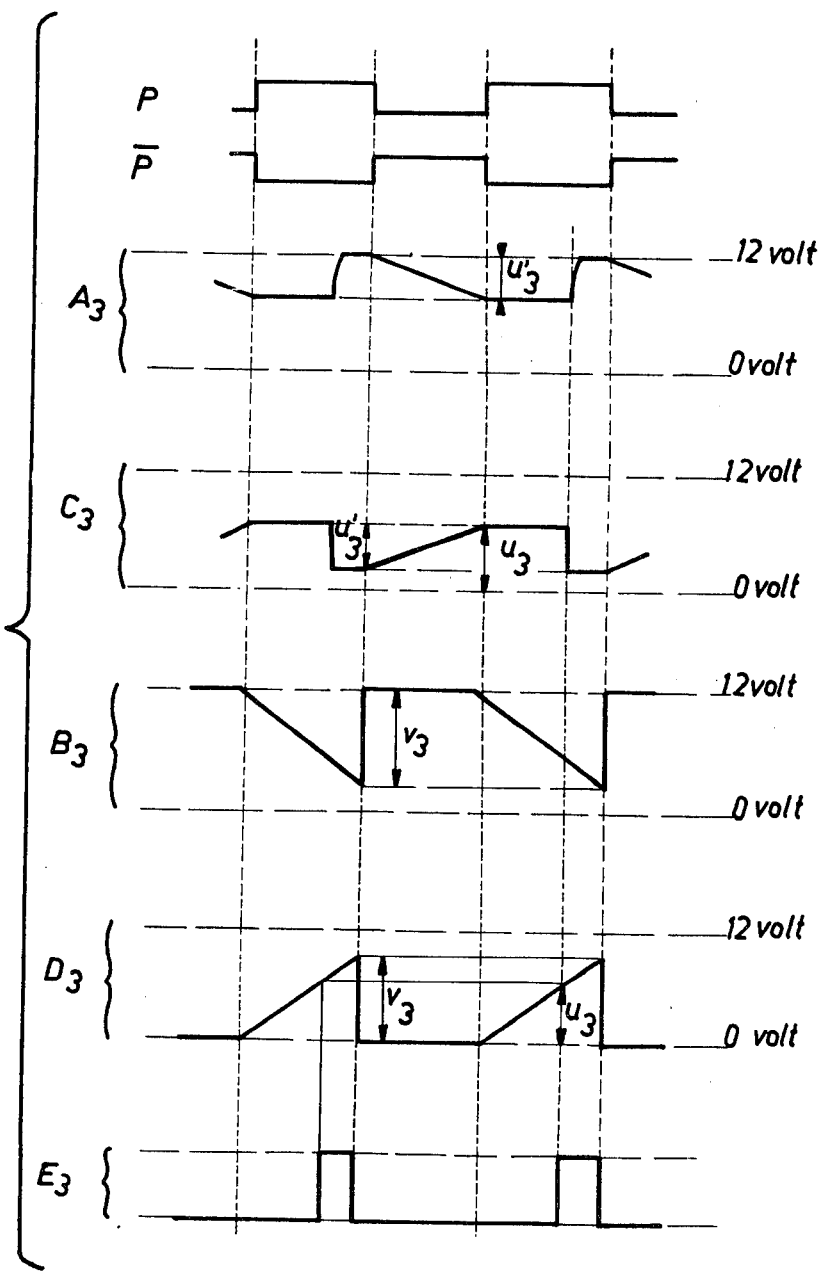
FIG. 7 shows the signals at various points on the circuit of FIG. 6.
Figure 8:
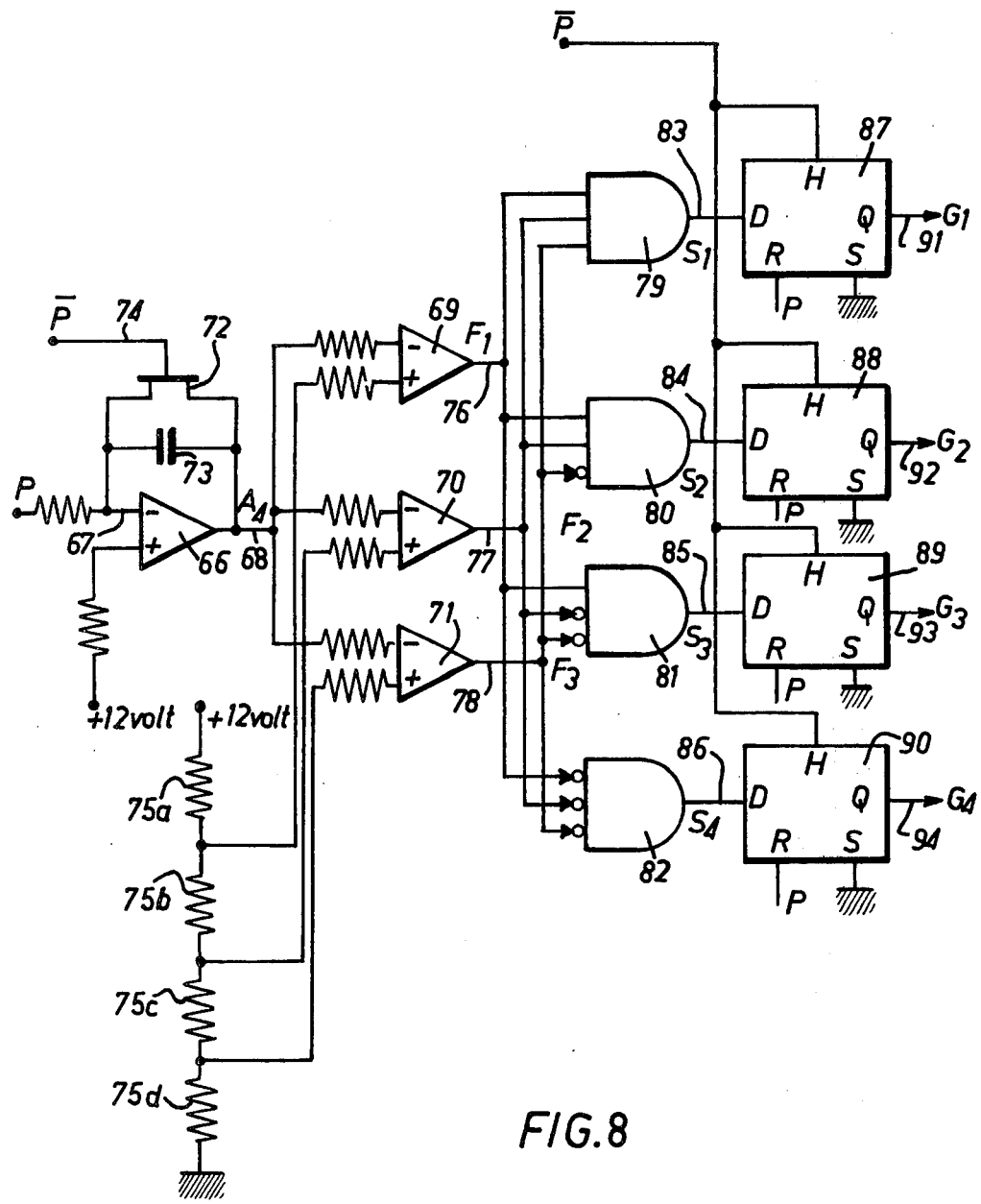
FIG. 8 shows the diagram of a discriminator circuit for discriminating between speed zones making it possible, in the first device according to the invention, to choose between different calculating circuits depending upon the speed.

To put into practice what has been described above, a calculating circuit is used which is illustrated on FIG. 6. On this figure it will be seen that the first voltage is generated by means of an operational amplifier 41 functioning as an integrator, and a subtractor 42 also comprising an operational amplifier component. The positive terminal of the component 41 is connected to the +12 volt supply and its negative terminal 43 is supplied by the signal $\overline{P}$. The output 44 of the component 41 is connected to the negative input of the subtractor 42, the positive terminal of which is supplied through the conductor 45 with a positive voltage $k = \gamma K$, the conductor 45 being connected to ground through a resistance 46. The output 47 of the subtractor 42 is connected to the negative terminal of the comparator 48 comprising an operational amplifier component. The component 41 has connected between its input terminal 43 and its output 44 a field effect transistor 49 mounted in parallel across the terminals of condenser 50. The grid of the transistor 49 is connected to the output 51 of an AND gate 52, one of the inputs 53 of which receives the signal P and the other input 54 of which is connected to the output 55 of the comparator 48. Between the negative input of the subtractor 42 and the output 47 of this subtractor, a by-pass resistance 56 is connected.

The component 41 functioning as an integrator produces on its output 44 a voltage which, at the end of the signal $\overline{P}$ has reached the value $12 - U'_3 = (12 - \gamma\alpha\overline{q})$. This voltage is maintained after passage of the leading edge of the next signal P due to the condenser 50. At the output 47 of the subtractor 42 is produced a voltage which, at the beginning of the signal $\overline{P}$ has the value $\gamma K$, and which increases linearly to reach, at the end of the signal $\overline{P}$, the value $\gamma(K + \alpha\overline{q})$. After the leading edge of the following signal P has passed, this value is maintained constant at the output 47. The voltages at the points A3 and C3 of the circuit of the FIG. 6 are shown on the third and fourth lines of the graph constituting FIG. 7.

The second voltage, proportional to time, is generated by the operational amplifier 57, the positive input of which is connected to the +12 voltage and the negative input of which receives the signal P through the conductor 58. The output 59 of the component 57 is connected to the negative terminal of an inverter 60, the positive terminal of which is supplied by the +12 volt voltage. A field effect transistor 61 is connected in parallel between the input 58 and the output 59. The grid of this transistor receives through the conductor 62 the signal P. A condenser 63 is connected across the terminals of the transistor 61. A resistance 64 is connected in parallel between the input 59 and the output 65 of the component 60, which is an operational amplifier functioning as an inverter. During the duration of the signal P, the voltage at the output 59 of the component 57, which functions as an integrator, varies linearly from 12 volts to $(12 - \gamma\overline{q})$ volts and the voltage at the output 65 of the inverter 60 varies linearly as a function of time from zero volts to the value $V_3 = \gamma\overline{q}$. The variation of the voltages at the points B3 and D3 of the diagram of FIG. 6 is illustrated on the fifth and sixth lines of FIG. 7.

When the voltages at the two inputs of the comparator 48 are equal, this comparator supplies a signal at its output 55. Since the leading edge of this signal is produced at the moment at which it is desired to initiate ignition, this leading edge may be used to control the ignition. The presence of the signal at the output 55 results in supplying the output 51 of the gate 52 so that the transistor 49 becomes conductive and returns the value of the voltage at the output 44 of the integrator 41 to 12 volts. The leading edge of the following signal $\bar{P}$ renders the transistor 61 conductive, which returns the value of the voltage on the output 59 of the integrator 57 to 12 volts. It follows that at the end of the signal P the voltage on the conductor 65 is cancelled, thus cancelling the signal emitted at the output 55. The voltage at the output 55 is represented on the seventh line in FIG. 7.

We have now described the calculating circuit which makes it possible to provide an ignition control signal for internal combustion engines in which a curve representing the advance of the ignition as a function of the speed of rotation is in the form of straight segments having a zero positive or negative slope. It is known that, in fact, the desired curves consist of an assembly of straight segments so that when the speed of rotation varies it is convenient to pass from one calculating circuit to another as a function of the value of said speed of rotation. If it be supposed that the desired curve of advance of the ignition as a function of the speed of rotation is as illustrated on FIG. 11, a circuit will now be described for discriminating between speed zones which circuit permits the selection of a calculating circuit such as has already been described. Such a speed discriminating circuit is illustrated on FIG. 8.

The speed zone discriminator comprises an operational amplifier 66 the positive terminal of which is supplied by the +12 volt supply and the negative terminal 67 of which receives the signal P. The output 68 of the component 66 is connected to the three negative terminals of three comparators, 69, 70, 71, having operational amplifier components. A field effect transistor 72 is mounted in parallel across the terminals 67 and 68. This transistor has a condenser 73 connected across its terminals. The grid 74 of the transistor 72 receives the signal $\bar{P}$. The positive terminals of the comparators 69, 70, 71 are connected to different points (75a, 75b, 75c, 75d) on a resistor, one end of which is connected to ground and the other end of which is connected to the +12 volt supply voltage. Three predetermined voltages Z1, Z2, Z3 are taken off this resistance and applied respectively to the positive terminals of comparators 69, 70, 71. The outputs 76, 77, 78 of the three comparators 69, 70, 71 are connected to the inputs of four AND gates indicated by reference numerals 79, 80, 81, 82. Each AND gate has three inputs. The gate 82 has its three inputs provided with inverters. The gate 81 has inverters on the two of its inputs which are connected to the outputs 78 and 77. The gate 80 has an inverter on the input which is connected to the output 78. The outputs 83, 84, 85, 86 of the four gates 79, 80, 81 and 82, respectively, are connected to the inputs D of four switches 87, 88, 89, 90. Each of these four switches has an input terminal H supplied by the signal $\bar{P}$, an input terminal R (for return to zero) supplied by the signal P, and an input terminal S connected to ground. The outputs of the bistable switches 87, 88, 89, 90 have been designated respectively by 91, 92, 93 and 94. These four outputs are each connected to a calculating circuit corresponding to one of the four speed zones which are to be distinguished.

When the signal P arrives at the input 67, the component 66 acts as an integrator and the voltage at its output 68 decreases linearly from 12 volts to $(12 - \gamma q)$ volts, the minimum value attained being a function of $q$, and consequently of the speed of rotation of the disc 1. The smaller the speed of rotation the more this minimum value of the voltage decreases so that it may attain successively the values of voltages Z1, Z2, Z3. The voltage signal at the output 68 has been illustrated at the third line on FIG. 9A. This is the voltage at the point A4 of the diagram of FIG. 8 when the minimum of this voltage is greater than the voltage Z1. The same illustration has been given on FIGS. 9B, 9C and 9D respectively for the case in which the minimum of the voltage of the output 68 is between Z1 and Z2, between Z2 and Z3, or less than Z3.

Figure 9A:
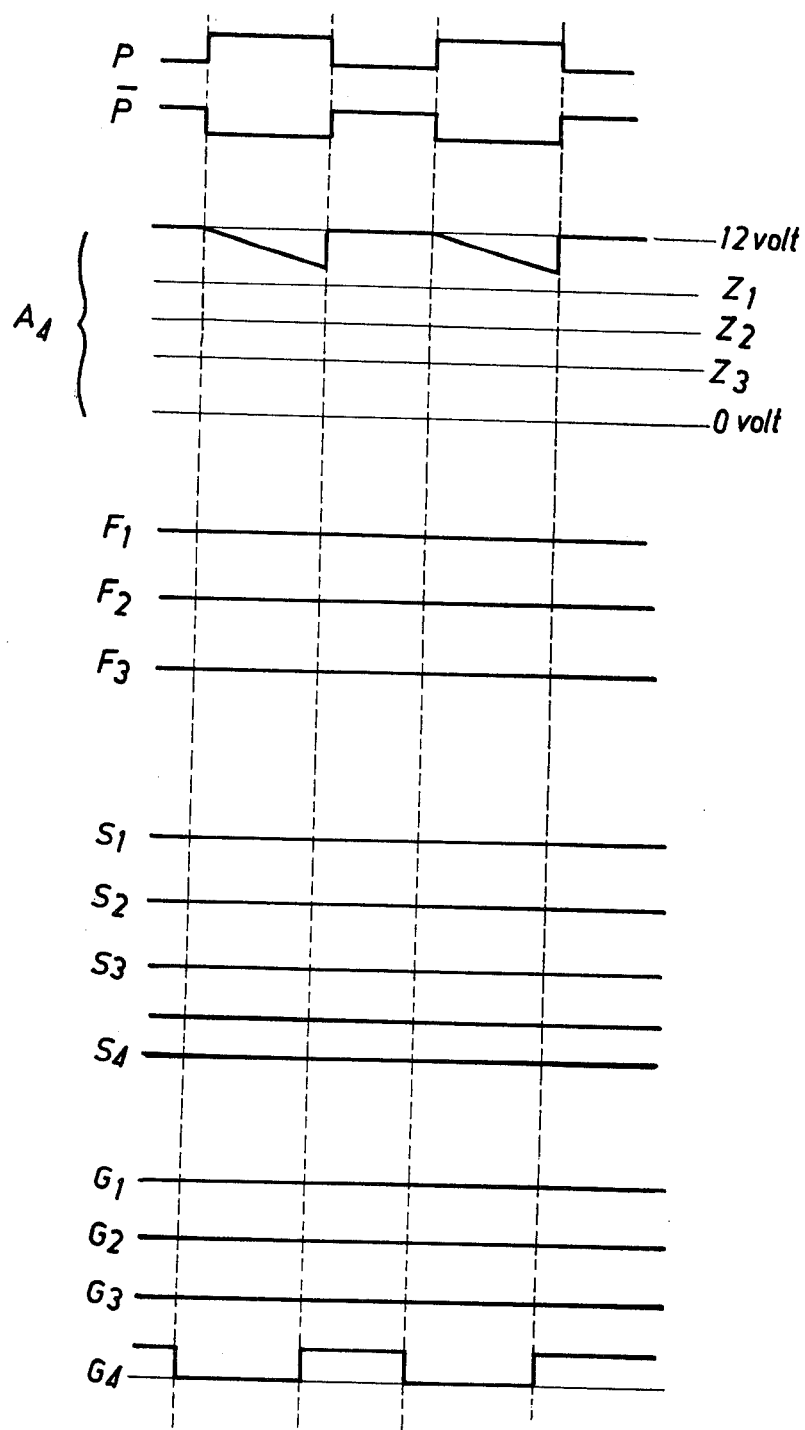
FIGS. 9a, 9b, 9c and 9d show the signals obtained at different points in the discriminator of FIG. 8 and each of the four segments defined by the curve of FIG. 11.

In the case corresponding to FIG. 9A, it will be seen that two inputs of the three comparators 69, 70 and 71 never have an equal voltage so that the output of the three comparators always remain zero. It follows that the outputs of the three gates 79, 80 and 81 are never supplied and only the output 86 of the gate 82 remains permanently supplied. Each time that the leading edge of the signal $\bar{P}$ arrives at the input H of the bistable switch 90, a signal is produced at the output 94, said signal being maintained until the arrival of the leading edge of the signal P at the input R of the switch 90. There is thus selectively produced at the output 94 a signal $\bar{P}$.

Figure 9B:
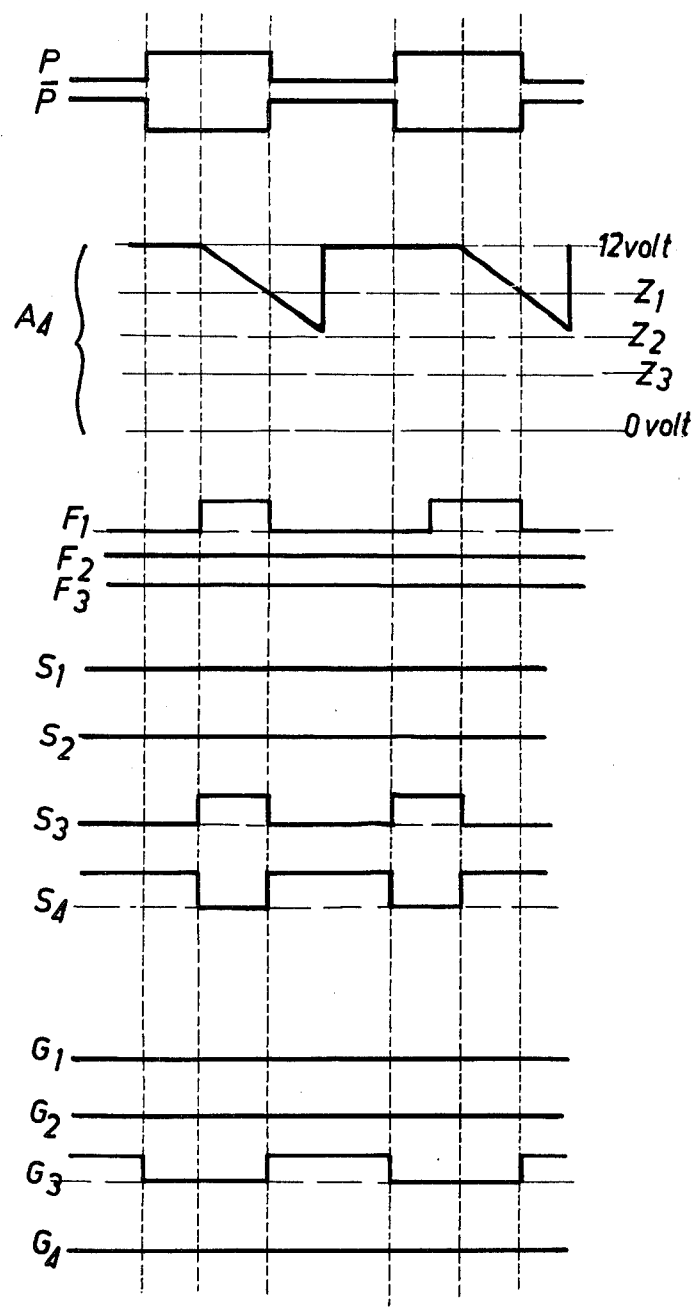

In the case illustrated on FIG. 9B, the minimum voltage attained at the output 68 lies between Z1 and Z2. An equality of voltage between the two inputs of the comparator 69 is obtained during the signal P. Before this equality is attained, the three outputs of the gates 79, 80 and 81 are not supplied and the output of the gate 82 is supplied by a signal which is suppressed when a signal appears at the output 76. At this same moment the output 85 is supplied by a signal which is maintained until the moment at which the output 68 is returned to its initial value by the leading edge of the signal $\bar{P}$, which renders the transistor 72 conductive. At this moment the signal at the output 86 is re-established. At the moment represented by the leading edge of the signal $\bar{P}$, only the output 85 is supplied and it follows that, as has been previously indicated for the bistable switch 90, the bistable switch 90 supplies its output with a signal which is maintained until the arrival of the leading edge of the succeeding signal P. A signal P has thus been selectively created at the output 93.

Figure 9C:
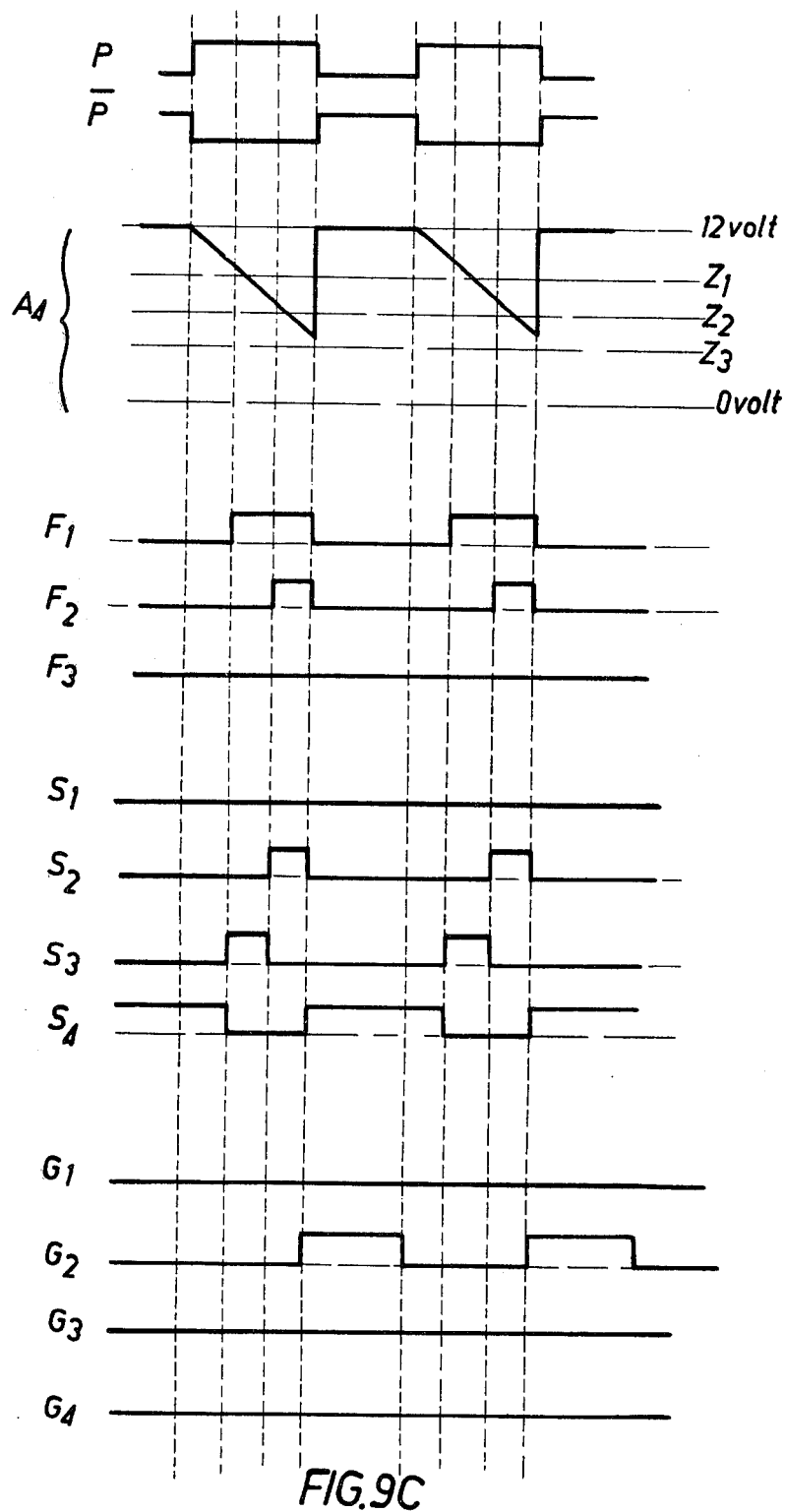
Figure 9D:
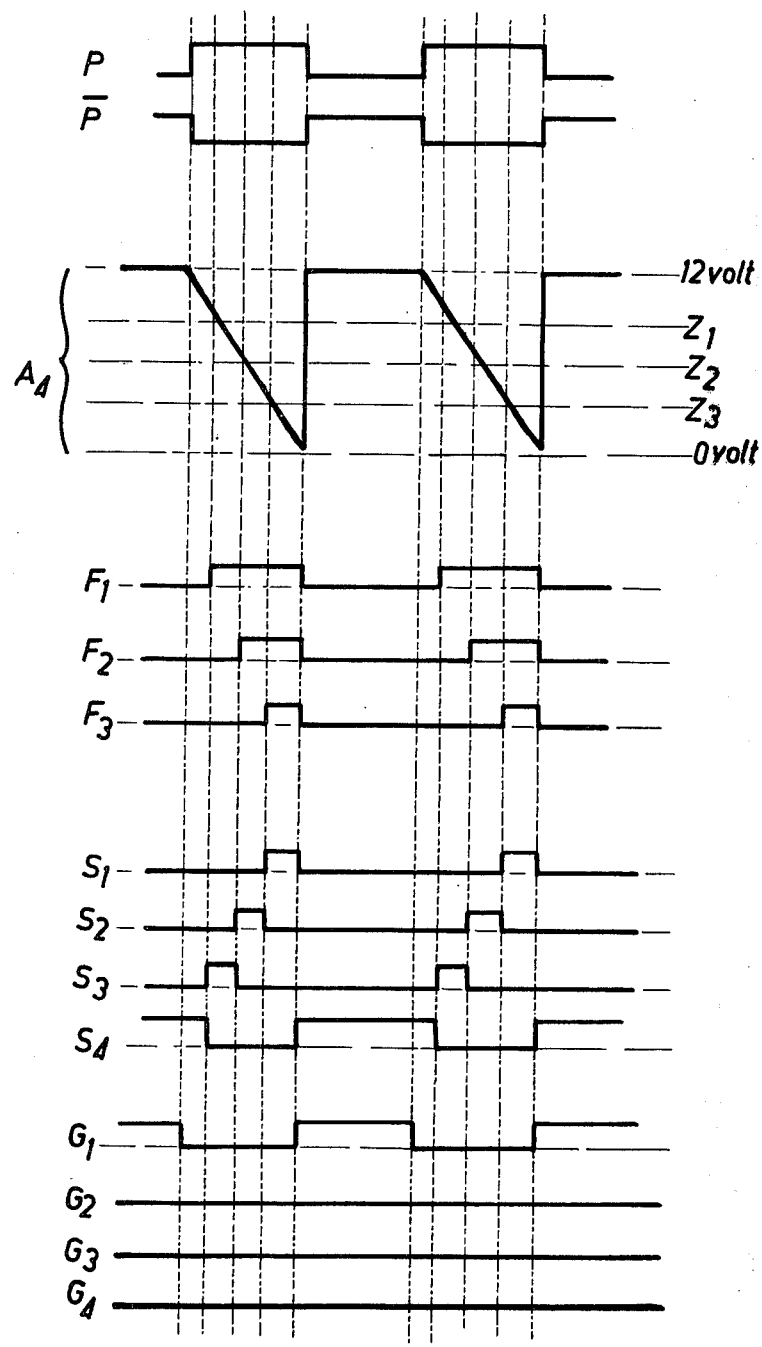

In the same manner, FIGS. 9C and 9D show the voltage signals in the cases in which the minimum voltage at the output 68 lies between Z2 and Z3 for FIG. 9C, and below Z3 for FIG. 9D. In the first case, at the end of each signal P, only the output 84 is supplied. This generates a signal $\bar{P}$ at the output 92 of the bistable switch 88. In the second case, only the output 83 is supplied at the end of each signal P, which generates signal $\bar{P}$ at the output 91 of switch 87. It will be seen that, with the discriminator circuit which has been described, it is possible, depending on the speed zones to be dealt with, to selectively generate at one of the outputs 91, 92, 93, 94, a signal $\bar{P}$ which may be used to supply the calculating circuits associated with each of the four bistable switches.

Figure 10:
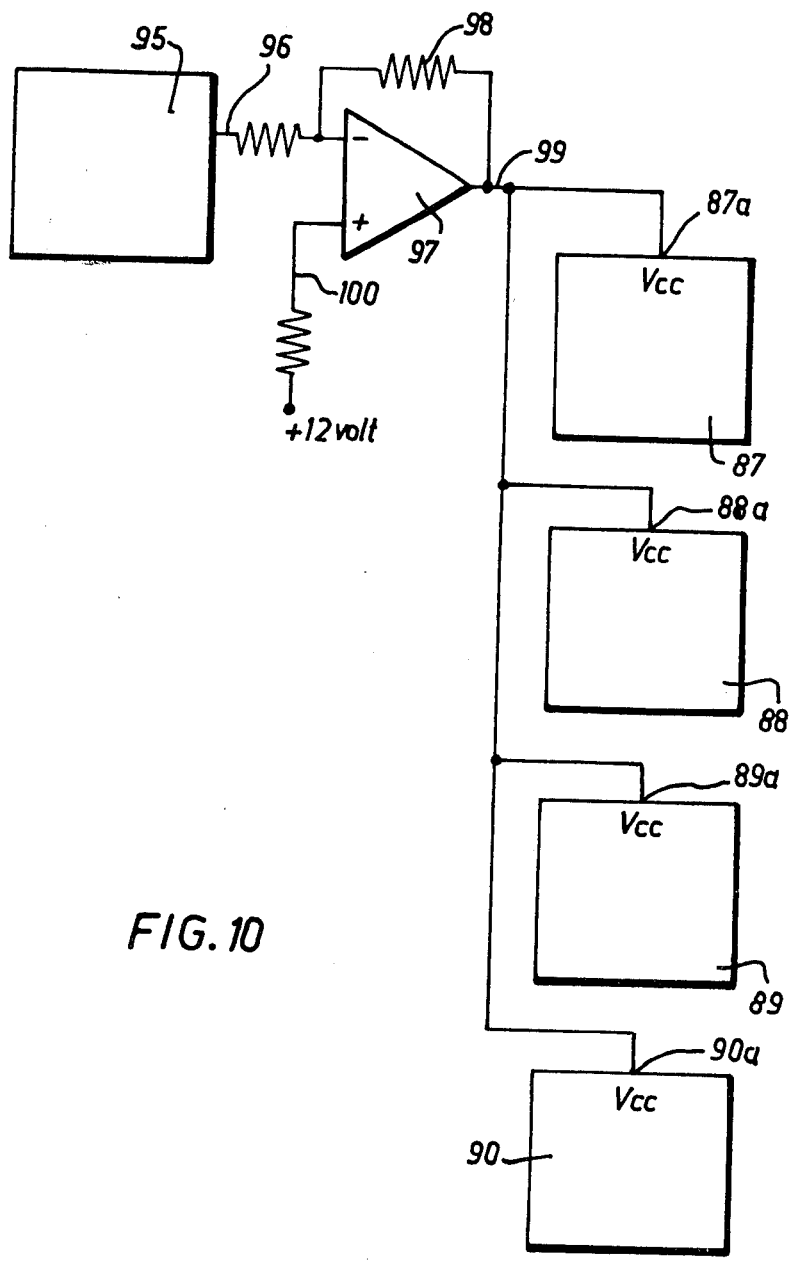
FIG. 10 shows the diagram of a circuit in the first embodiment of the invention for producing an adjustment of the ignition timing which is not a function of the speed of rotation but is the function of the value of a vacuum.

When it is desired to produce a predetermined advance in the ignition which is not a function of the speed of rotation, but is a function of a parameter independent thereof, such as the vacuum in the intake for example, a complementary circuit is used such as the one illustrated on FIG. 10. In fact, if it be supposed that the vacuum does not vary rapidly with respect to the frequency of the signal P, it is a question of providing a step in the curve of advance of the ignition relative to the speed of rotation of the shaft, the level of which step may be varied as a function of the vacuum. It has already been seen that the calculating circuit which makes it possible to provide a step in the ignition curve, comprises an integrator, the output voltage of which is proportional to the time which has passed since the beginning of the supply signal. The coefficient of proportionality of such an integrator cannot be modified because it is determined by the time constant of the integrator. In order to be able to vary the coefficient of proportionality, it is necessary to vary the value of the voltage applied to the input of the integraator during the supply signal. Since the calculating circuits are supplied by the outputs 91, 92, 93, 94 of the bistable switches of the discriminator between speed zones, the variation in the aforesaid voltage is produced by modulating the supply voltage of the bistable switches 87, 88, 89, 90. This modulation is controlled by a vacuum responsive pick-up. It is obvious that if it is desired to utilize a parameter other than vacuum it would suffice to control the modulation of the supply voltage of the switches by means of this parameter.

On FIG. 10 reference numeral 95 indicates the vacuum-responsive pick-up which causes the advance of the ignition as a function of the vacuum. The pick-up 95 is associated with a rheostatic device which makes it possible to supply at the output 96, a voltage proportional to the variation in the vacuum measured by the pick-up. This voltage supplies the negative terminal of an operational amplifier component 97 serving as an inverter, a resistance 98 being connected in parallel between the negative input terminal and the output 99 of the component 97. The positive input terminal 100 of the component 97 is connected to the +12 volt voltage supply. Its output 99 is connected to the supply terminals of the four bistable switches 87, 88, 99, 90, so as to make it possible to obtain the desired modulation. It should be noted that, for purposes of simplification, the supply terminals 87a, 88a, 89a, 90a of the bistable switches 87, 88, 89, 90, have not been shown on FIG. 8.

Figure 12:
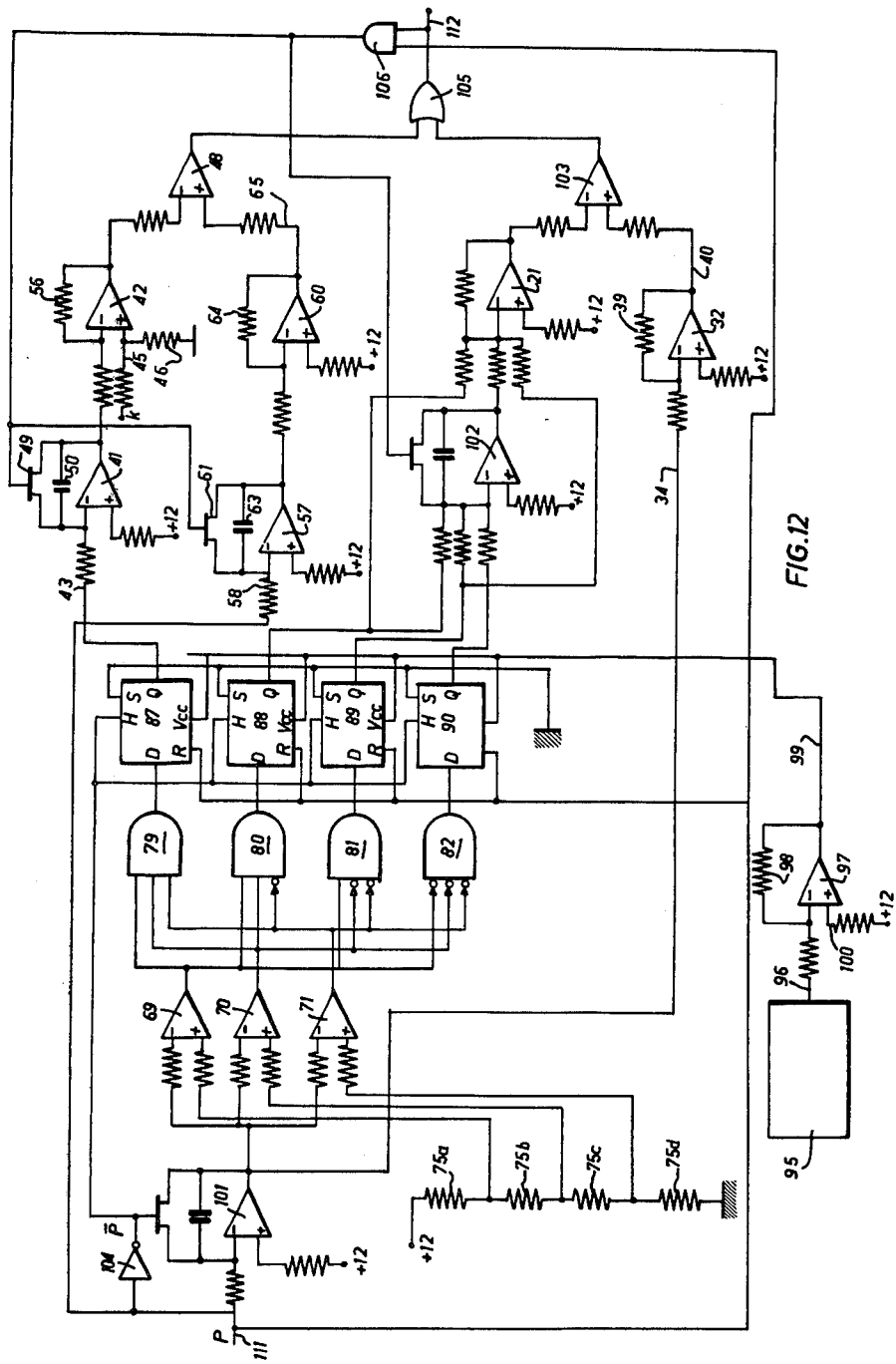
FIG. 12 is a diagram of the assembly of the first device according to the invention adapted to produce the curve of FIG. 11.

The different circuits which have been hereinbefore described to illustrate the device according to the invention have been combined in the schematic diagram of FIG. 12, certain of the components of this overall circuit functioning simultaneously in several component circuits. On FIG. 12, the reference numerals previously applied to various components serve exactly and solely the same purposes as those for which they have previously been used. On the other hand, reference numeral 101 indicates an operational amplifier simultaneously serving the purpose of the components 13 and 32 and 66; while the operational amplifier components 102 serve simultaneously the purpose of components 4 and 18; the component 103 serves simultaneously the purpose of comparators 5 and 23; the outputs of comparators 48 and 103 are connected to two inputs of an OR gate 105; and the AND gate 106 serves simultaneously the purpose of the gates 11, 28 and 52.

On FIG. 11 it will be seen that reference numerals 107, 108, 109 and 110 indicate the four straight segments making up the desired curve of ignition advance as a function of speed of rotation. Segment 110 is a step, the segment 107 is a segment having a negative slope, and the two segments 108 and 109 are segments having different positive slopes. The voltages K which are required in the two calculating circuits to provide the segment of positive slope, are supplied by the outputs of the bistable switches 88 and 89 and one or the other is thus added to the negative input of the adder 21. In like manner, the negative terminal of the component 102 is connected to the bistable switches 88, 89, 90 so as to serve as an integrator in the calculating circuits belonging to the three segments 108, 109, 110 of the ignition curve. In addition to this common use of several components by the different calculating circuits previously described, the schematic diagram of FIG. 12 makes it possible to recognize all the components previously described and the details of their operation will not be repeated. The signal $\bar{P}$ is obtained by means of the inverter 104 so that the circuit of FIG. 12 is only supplied at its input 111 by the signal P and it furnishes at its output 112 a signal the leading edge of which is produced at the moment at which it is desired to initiate ignition according to the curve of advance represented on FIG. 11, including an advance in response to vacuum.

In the embodiment which has just been described, the operational amplifier components are of the type "CA 3741" manufactured by Radio Corporation of America. The switches 87, 88, 89, 90 are of the type "CD 4013" also produced by the Radio Corporation of America. The inverters are of the type "CD 4009" produced by RCA; the AND gates 79, 80, 81, 82 are obtained by positioning in series gates of the type "CD 4023" and gates of the type CD 4009 which are also produced by RCA. The AND gate 106 is provided by arranging in series gates of the type "CD 4011" and an inverter of the type CD 4009 also produced by RCA. The OR gate 105 is obtained by arranging in series a gate of the "CD 4001" type and an inverter of the CD 4009 type produced by RCA. The field effect transistors are of the "2N 3819" produced by Texas Instruments.

It is clear that instead of carrying out the calculations of the advance during the period $\bar{q}$ of a signal $\bar{P}$ and producing the ignition during the period $q$ of the following signal P, the calculation of the advance may be made during a period $q$ of the signal P and the production of the ignition during the duration $q$ of the following signal P. For this purpose it suffices to add, after each integrator of the calculating circuits which are supplied by the switches 87, 88, 89, 90, a buffer condenser reset to zero at the instant of ignition by a field effect transistor mounted across its terminals, the base of said transistor being connected to the output 112 which delivers the ignition control signal.

It will be seen that the second device according to the invention comprises a speed of rotation pick-up indicated by 200 as a whole.

This pick-up is identical to the one which has been described in detail in connection with the first embodiment, and which has been illustrated on FIG. 1. The pick-up 200 makes it possible to generate, during the passage of a sector having an angle $\phi$ in front of a fixed mark, the signal P having a duration $q$, and a complementary signal $\bar{P}$ having a duration $\bar{q}$, these two signals being illustrated in the first two lines of FIG. 18. The signal $\bar{P}$ supplies three identical sawtooth generators 201a, 201b, 301c. The voltage obtained at the output of these generators at the end of the period $\bar{q}$ is stored until the moment of restoration to the initial condition which will be hereinafter described. The voltage V5 obtained at the output of the generator 201a has been illustrated on the third line of FIG. 18.

The signal P is delivered to the input of three sawtooth identical generators 202a, 202b, 202c. The voltage V6 at the output of generator 202a has been illustrated on the fourth line of FIG. 18. The sawtooth generators 202a, 202b, 202c are each associated with a device 203a, 203b, 203c, respectively, which makes it possible to add a constant voltage to the sawtooth voltage obtained by the sawtooth corresponding generator. The fifth line of FIG. 18 shows the output voltage V7 obtained from the generator 202a–203a, the constant voltage added having been designated by $U_{11}$.

The outputs of the generators 202a–203a, 202b–203b, 202c–203c are respectively connected to one of the inputs of three comparators 204a, 204b, 204c, the other inputs of which are connected respectively to the generators 201a, 201b, 201c. A sixth line of the FIG. 18 represents the output signal of the comparator 204a. It shows a square wave signal the voltage establishes when there is equality between the voltages V5 and V7. The voltage V5 is proportional to $\bar{q}$ and may then be written $\gamma\bar{q}$. The voltage V6 is proportional to the time counted from the beginning of signal P, the high dead point in the corresponding cylinder corresponding to the leading edge of the signal P. By suitably selecting the gain of the integrator 202a it will be seen that we may then write $V6 = \gamma\beta t$. Under these conditions we will have $V7 = \gamma\beta t + U_{11}$ and when the two voltages V7 and V5 are equal we will have $$t = \frac{q}{\beta} - \frac{U_{11}}{\beta\gamma} + -K + a\,\bar{q},$$

which represents as has been indicated for the previously described first device according to the invention, the value of time $t$ from the leading edge of a signal P needed to obtain the moment of ignition in the case in which the curve of advance of the ignition is in the form of a straight segment having a positive slope. According to the values of the parameters $\beta$ and $U_{11}$ of the generators 202a–203a, 202b–203b, 202c–203c, it will be seen that the leading edges of the signals supplied by the comparators 204a, 204b, 204c which are respectively produced at the time of ignition correspond to different lines which, in the example described are respectively designated by $D_a$, $D_b$, $D_c$ on the diagram of FIG. 20. On this diagram it will be seen that the ignition curve consists of three straight segments 209a, 209b, 209c each forming part of the line $D_a$, $D_b$, $D_c$ respectively.

FIG. 19 illustrates the output signals of the three comparators 204a, 204b, 204c which have been respectively designated as $V_{8a}$, $V_{8b}$, $V_{8c}$. It will be seen that the leading edges of these output signals take place at moments which are spaced from the high dead point marked by the trailing edge of the signal P by intervals equal respectively to $t_a$, $t_b$, and $t_c$, each of these intervals of time representing a timing of the ignition which, for the given speed of rotation, corresponds to a given phase displacement on the diagram of FIG. 20 at the intersection of a line having for its abscissa the speed of rotation in the given case with each of the three lines $D_a$, $D_b$, $D_c$. It will be seen on the diagram of FIG. 20 that, in all cases, since the concavity of the curve constituted by the three straight segments 209a, 209b, 209c is downwardly directed, the point of intersection must be retained is that which is the lowest. This point of intersection has, for the speed of rotation marked by $N_a$ on FIG. 20, an ordinate equal to $Y_a$. The advance of the ignition Ya corresponds to the time $t_a$ and, since the point of intersection to be retained is always the lowest point on the diagram of FIG. 20, it is therefore necessary for the initiation of the ignition to be based on the output signal for the comparator which gives the time of phase displacement which is smallest with respect to the high dead point. On FIG. 19 it will be seen that it is necessary to initiate the ignition at the moment at which the leading edge of the signal $V_{8a}$ appears. This choice is made by transmitting the outputs of the three comparators to the inputs of one AND gate 205 which is opened when the three output signals of the comparator appear, that is to say at the beginning of the latest signal.

The output of the AND gate controls a monostable 206, the output signal $V_9$ of which is illustrated on the fourth line of FIG. 19. This output signal $V_9$ is used to control the power transistor in the supply circuit of the ignition coil of the motor with which the device according to the invention is associated. The return of the generators 202a, 202b, 202c to the initial state is produced by the leading edge of the signal $\bar{P}$. The return of 201a, 201b, 201c to the initial state is produced by the leading edge of the signal $V_9$.

When it is desired to modify the timing in dependence upon the vacuum in the intake of the motor with which the device according to the invention is associated, a pressure-responsive pick-up 208 is used which makes it possible to generate a voltage which is a function of the vacuum, and this voltage is supplied to the generator 201a, 201b, 201c after having passed through the amplifier circuits 207a, 207b, 207c respectively, in which said voltage is multiplied by coefficients which may be identical or different, depending upon the result sought. The application of the output voltage of the circuits 207a, 207b, 207c to the generators 201a, 201b, 201c makes it possible to modify the slopes of the sawteeth of the first voltage, that is to say, the slopes of the signals analogous to the signals $V_5$ represented on the third line of FIG. 18. It will thus be seen that it is possible to vertically raise the curve of advance as a function of the vacuum, the change being greater or less depending upon which of the segments 209a, 209b, or 209c is affected, by suitably adjusting the multiplying coefficients associated with the circuits 207a, 207b, 207c.

It will be seen that the device which has just been described makes it possible to provide a curve representing the advance of the ignition consisting of several straight segments, without it being necessary to utilize a speed discriminator, when the ignition curve to be provided is flat, increasing or decreasing.

It will, of course, be appreciated that the embodiments which have been hereinbefore described have been given purely by way of illustration and example, and may be modified as to detail without thereby departing from the basic principles of the invention.

What is claimed is:

1. In a method of assuring the periodic initiation of at least one operation in dependence upon at least one parameter, at least one of which parameters is dependent on the speed of rotation of a shaft, and in which said operation must be initiated with a phase displacement with respect to a particular angular position of the shaft relative to a fixed point, the extent of said phase displacement being a function of the speed of rotation of the shaft, and a curve representing the angle of phase displacement as a function of said speed of rotation being a substantially straight line in a predetermined zone, said process comprising the step of generating a signal P for a period $q$ the duration of which corresponds to the passage of a rotating sector driven by said shaft and subtending an angle $\phi$ past said fixed point, the angle $\bar{\phi}$ equal to ($2\pi - \phi$) corresponding to the absence of this signal for a period $\bar{q}$, during which a signal $\bar{P}$ may be generated.

the improvement which comprises the steps of generating during one of the periods $q$ and $q$ following the beginning of the signal P, a first voltage which is a linear function of one of said periods, storing this first voltage, generating during one of the succeeding periods a second voltage which is independent of the first and a linear function of the time since the beginning of said succeeding period of time of said signal P, generating a control signal when the second of the said voltages becomes equal to the first, and utilizing this control signal to initiate said operation, and in which the curve of phase displacement as a function of the speed of rotation of the shaft consists of a succession of straight segments and in which a discriminator between speeds is provided which receives at least one of the signals P and P and selects the parameters of the linear function corresponding to the first or the second voltage in dependence on the speed of rotation of the shaft.

2. In a method of assuring the periodic initiation of at least one operation in dependence upon at least one parameter, at least one of which parameters is dependent on the speed of rotation of a shaft, and in which said operation must be initiated with a phase displacement with respect to a particular angular position of the shaft relative to a fixed point, the extent of said phase displacement being a function of the speed of rotation of the shaft, and a curve representing the angle of phase displacement as a function of said speed of rotation being a substantially straight line in a predetermined zone, said process comprising the step of generating a signal P for a period $q$ the duration of which corresponds to the passage of a rotating sector driven by said shaft and subtending an angle $\phi$ past said fixed point, the angle $\bar{\phi}$ equal to ($2\pi - \phi$) corresponding to the absence of this signal for a period $\bar{q}$, during which a signal P may be generated, the improvement which comprises the steps of generating during one of the periods $\bar{q}$ and $q$ following the beginning of the signal P, a first voltage which is a linear function of one of said periods, storing this first voltage, generating during one of the succeeding periods a second voltage which is independent of the first and a linear function of the time since the beginning of said succeeding period of said signal P, generating a control signal when the second of the said voltages becomes equal to the first, and utilizing this control signal to initiate said operation, and in which the curve of phase displacement as a function of the speed of rotation of the shaft comprises a succession of straight line segments and in which a plurality of control signals corresponding to several lines having straight segments constituting said curve are simultaneously generated, which process comprises the step of selecting from among said signals the one which corresponds to the least phase displacement or the greatest phase displacement, depending on whether said curve is concave downwardly or upwardly.

3. Process as claimed in claim 2 in which in order to select one control signal from among the plurality of control signals simultaneously produced, said control signals are supplied to the input of an AND gate.

4. Process as claimed in claim 2 in which all of the control signals produced are obtained simultaneously by distinct circuits having the same construction.

* * * * *